(12) United States Patent
Katayama et al.

(10) Patent No.: US 7,104,046 B2
(45) Date of Patent: Sep. 12, 2006

(54) CONTROLLER FOR AN INTERNAL COMBUSTION ENGINE

(75) Inventors: Akihiro Katayama, Toyota (JP); Tokiji Ito, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 29 days.

(21) Appl. No.: 10/946,190

(22) Filed: Sep. 22, 2004

(65) Prior Publication Data

US 2005/0060988 A1  Mar. 24, 2005

(30) Foreign Application Priority Data

Sep. 24, 2003  (JP)  ............... 2003-331785

(51) Int. Cl.
*F01N 3/00* (2006.01)
*F01N 3/10* (2006.01)

(52) U.S. Cl. ............... 60/285; 60/277; 60/295; 60/300

(58) Field of Classification Search ............ 60/272, 60/282, 285, 295, 299, 300
See application file for complete search history.

(56) References Cited

U.S. PATENT DOCUMENTS

| | | | | |
|---|---|---|---|---|
| 5,950,419 A | * | 9/1999 | Nishimura et al. | ......... 60/274 |
| 6,145,306 A | * | 11/2000 | Takagi et al. | ......... 60/283 |
| 6,499,291 B1 | * | 12/2002 | Lang et al. | ......... 60/277 |
| 6,505,464 B1 | * | 1/2003 | Isobe et al. | ......... 60/277 |
| 6,568,175 B1 | * | 5/2003 | Izumiura et al. | ......... 60/284 |
| 6,601,384 B1 | * | 8/2003 | Isobe et al. | ......... 60/285 |
| 6,622,478 B1 | * | 9/2003 | Nakamura | ......... 60/285 |
| 2003/0005685 A1 | * | 1/2003 | Lewis et al. | ......... 60/285 |
| 2003/0130785 A1 | * | 7/2003 | Ishikawa et al. | ......... 701/110 |

FOREIGN PATENT DOCUMENTS

| | | |
|---|---|---|
| JP | 07-208153 | 8/1995 |
| JP | 2001-132438 | 5/2001 |
| JP | 2001-132519 | 5/2001 |
| JP | 2003-120382 | 4/2003 |
| JP | 2003-120408 | 4/2003 |
| JP | 2003-138967 | 5/2003 |

* cited by examiner

*Primary Examiner*—Thomas Denion
*Assistant Examiner*—Loren Edwards
(74) *Attorney, Agent, or Firm*—Kenyon & Kenyon LLP

(57) ABSTRACT

A controller executes temperature rise control on a catalyst device by retarding ignition timing that is set based on engine operating conditions. The controller reaches a diagnosis that the temperature rise control is normal if an advance angle side accumulated time for which the ignition timing is set exceeding a threshold value to an advance angle side during execution of the temperature rise control is less than an accumulated time determination value. When the advance angle side accumulated time is greater than or equal to the accumulated time determination value, the controller reaches a diagnosis that the temperature rise control has an anomaly.

9 Claims, 8 Drawing Sheets

CONTROLLER FOR AN INTERNAL COMBUSTION ENGINE

This application claims priority to Japanese Patent Application No. 2003-331785 filed 24 Sep. 2003, the content of which is incorporated herein by reference in its entirety.

BACKGROUND OF THE INVENTION

The present invention relates to an internal combustion engine controller designed to raise the temperature of a catalyst device by retarding ignition timing.

A catalyst device used in an exhaust system of an internal combustion engine for purifying exhaust gas demonstrates its purification function when the temperature is raised to a predetermined activation temperature. Therefore, when the temperature of the catalyst device is low such as when the engine is started, temperature rise control is performed on the catalyst device by retarding the ignition timing to raise the exhaust gas temperature so that the catalyst device is activated rapidly.

To diagnose whether or not a command value that is set by an ignition timing controller is set to an appropriate value for warming up the catalyst device, that is, to determine whether or not the temperature rise control of the catalyst device is actually being carried out, Japanese Laid-Open Patent Publication 2001-132519 describes an example of an apparatus that monitors whether or not an ignition timing set to a predetermined timing when warming up a catalyst device is within a predetermined range.

In the apparatus described in the above patent publication, the temperature rise control is performed using a crankshaft angle value, which indicates the ignition timing. This may lead to the problems described below.

The ignition timing is set basically in correspondence with engine operating conditions. Thus, the crankshaft angle, which indicates the ignition timing, may temporarily assume a value outside the predetermined range even if the temperature rise control is being executed. If a sufficient period is ensured for retarding the ignition timing during the temperature rise control, the temperature of the catalyst device is sufficiently raised even if the amount of retardation of the ignition timing temporarily falls below the required level. However, the apparatus described in the above patent publication may erroneously diagnose that there is an anomaly in the temperature rise control due to temporary fluctuation of ignition timing even though the temperature of the catalyst device is being raised sufficiently by the temperature rise control.

SUMMARY OF THE INVENTION

It is an object of the present invention to provide an internal combustion engine controller capable of accurately diagnosing whether or not there is an anomaly in the temperature rise control of a catalyst device.

One aspect of the present invention is an internal combustion engine controller for performing temperature rise control in a catalyst device by retarding ignition timing that is set based on engine operating conditions. The controller includes logic that when executed performs steps including determining whether a period of time has accumulated for which ignition timing has been set exceeding a threshold value to an advance angle side during execution of temperature rise control, and diagnosing the temperature rise control for an anomaly based on the accumulated time.

The condition of temperature rise in a catalyst device can be monitored by accumulating the time for which ignition timing to be retarded by the temperature rise control has been set to an advance angle side exceeding a threshold value, or in other words the catalyst device has been exposed to exhaust gas of low temperature. Therefore, according to the present invention, the temperature rise control is diagnosed by monitoring the condition of temperature rise of the catalyst device based on such accumulated time. As a result, the diagnosis of the temperature rise control can be conducted with higher accuracy without being affected by temporary fluctuation of ignition timing.

A further aspect of the present invention is an internal combustion engine controller for performing temperature rise control in a catalyst device by retarding ignition timing that is set based on engine operating conditions. The controller includes logic that when executed performs steps including determining whether a period of time has accumulated for which ignition timing has been set exceeding a threshold value to a retard angle side during execution of the temperature rise control, and diagnosing the temperature rise control for an anomaly based on the accumulated time.

The condition of temperature rise in a catalyst device can be monitored by accumulating the time for which ignition timing to be retarded by the temperature rise control has been set to a retard angle side exceeding a threshold value, or in other words the catalyst device has been exposed to exhaust gas of high temperature. Therefore, according to this other embodiment of the present invention, the temperature rise control is diagnosed by monitoring the condition of temperature rise of the catalyst device based on such accumulated time. As a result, the diagnosis of the temperature rise control can be conducted with higher accuracy without being affected by temporary fluctuation of ignition timing.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

First Embodiment

A first embodiment of an internal combustion engine controller according to the present invention will now be described in detail with reference to FIGS. 1 through 3.

Figure 1:
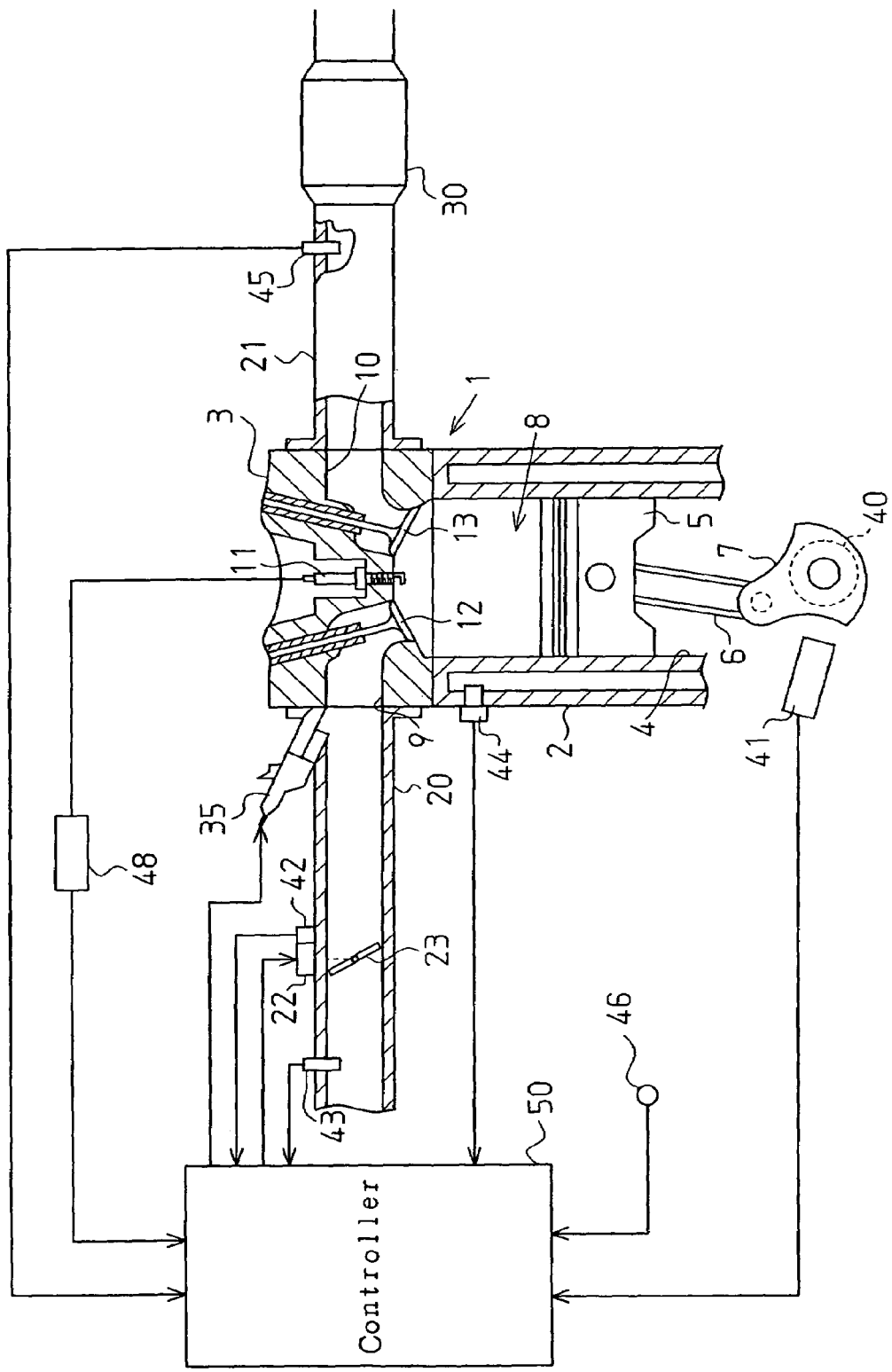
FIG. 1 is a schematic view of a controller and an internal combustion engine according to the present invention.

FIG. 1 is a schematic view showing a gasoline engine 1, to which the controller of the present invention is applied, together with peripheral elements.

The gasoline engine 1, which is a multiple-cylinder engine, includes a cylinder block 2 provided with a plurality of cylinders 4 (only one is shown in FIG. 1 for the sake of convenience). The cylinder 4 accommodates a piston 5. The piston 5 is connected to a crankshaft 7, which serves as an engine output shaft, via a connecting rod 6.

A cylinder head 3 is attached to the top of the cylinder block 2. In the cylinder 4, a combustion chamber 8 is defined between the top end of the piston 5 and the cylinder head 3. The cylinder head 3 is provided, for each of the cylinders 4, with an ignition plug 11 for igniting the air-fuel mixture within the combustion chamber 8.

The cylinder head 3 is further provided, for each of the cylinders 4, with an intake port 9 for drawing air into the combustion chamber 8 and an exhaust port 10 for discharging exhaust gas from the combustion chamber 8. The intake port 9 is provided with an intake valve 12 for opening and closing the intake port 9. The exhaust port 10 is provided with an exhaust valve 13 for opening and closing the exhaust port 10. Each of the cylinders 4 is provided with a fuel injection valve 35 which injects fuel into the associated intake port 9.

The intake port 9 and the exhaust port 10 are connected to an air intake passage 20 and an exhaust passage 21, respectively. A throttle valve 23 is arranged in the intake passage 20. The open degree of the throttle valve 23 is adjusted by an actuator 22 driven based on the operation of an accelerator pedal. The amount of air drawn into the combustion chamber 8 is adjusted by altering the open degree of the throttle valve 23.

The exhaust passage 21 includes a catalyst device 30 provided with a function for purifying exhaust gas. When the catalyst device 30 is heated to a predetermined high temperature, carbon hydride (HC), carbon monoxide (CO) and nitrogen oxides (NOx) are removed from the exhaust gas.

The gasoline engine 1 is provided with various sensors for detecting the engine operating conditions. For example, the crankshaft 7 has a crank rotor 40 which rotates integrally with the crankshaft 7. A speed sensor 41 is arranged in the vicinity of the crank rotor 40 to detect the rotation speed of the crankshaft 7, or the engine speed NE. A throttle sensor 42 is arranged in the vicinity of the throttle valve 23 to detect the open degree TA of the throttle valve 23 (throttle open degree TA). Additionally, an airflow meter 43 is arranged upstream from the throttle valve 23 for detecting the amount of intake air flowing through the intake passage 20, or the intake air amount QA. A coolant temperature sensor 44 is arranged on the cylinder block 2 to detect the coolant temperature THW. An air-fuel ratio sensor 45 arranged in the exhaust passage 21 detects the concentration of oxygen in the exhaust gas. A starter switch 46 outputs an ON signal when a starter motor, which starts the engine, is activated and outputs an OFF signal, when the starter motor is inactivated.

Various controls of the gasoline engine 1, including ignition timing control and fuel injection control, are performed by a controller 50. The controller 50 is mainly configured by a microcomputer having a central processing control unit (CPU). For example, the controller 50 is provided with a read-only memory (ROM) in which various programs and maps are stored in advance, a random-access memory (RAM) for temporarily storing computation results of the CPU, a timer counter, an input interface, and an output interface.

Output signals from the speed sensor 41, the throttle sensor 42, the airflow meter 43, the coolant temperature sensor 44, and the air-fuel ratio sensor 45 are input to the input interface. The operating conditions of the gasoline engine 1 are detected by these sensors.

The output interface is connected to a fuel injection valve 35, an ignition coil 48 for applying high voltage to the ignition plug 11, and the actuator 22 of the throttle valve 23 via corresponding driving circuits. The controller 50 thus controls the fuel injection valve 35, the ignition coil 48, and the actuator 22 based on signals sent from the above sensors according to control programs and control data stored in the ROM.

The controller 50 sets basic ignition timing IGNb based on the engine speed NE and an engine load, which is computed from parameters such as the intake air amount QA and the throttle opening TA. The controller 50 then corrects the basic ignition timing IGNb by using a correction value computed in accordance with knocking control and engine conditions to obtain a final ignition timing IGNf. Ignition timing is normally indicated by the crankshaft angle. Zero represents the position of the piston at the compression top dead center TDC so that an ignition timing set when the piston is located at a position corresponding to before compression top dead center BTDC assumes a positive value and an ignition timing set when the piston is located at a position corresponding to after compression top dead center ATDC assumes a negative value. Accordingly, the value of ignition timing increases as the ignition timing is set at a more advanced angle.

When the engine is started from a cold state or a semi-warm state, the temperature of the catalyst device 30 is too low for the catalyst device 30 to fully exhibit the function for purifying exhaust gas. Therefore, in the present embodiment, when the engine is started from such a state, temperature rise control is performed on the catalyst device 30 so that the temperature of the catalyst device is raised rapidly by retarding the ignition timing. More specifically, the final ignition timing IGNf is retarded by using a retard angle correction amount that is computed based on the cooling coolant temperature THW and other parameters when starting the engine. Thus, the final ignition timing IGNf is set at a more retarded angle compared to when the temperature rise control is not executed. This increases the temperature of exhaust gas and rapidly activates the catalyst device 30.

The temperature of the catalyst device 30 may not be raised sufficiently if the setting value of the final ignition timing IGNf that is set during execution of the temperature rise control is not suitable for warming up the catalyst device 30 (for example, when the final ignition timing IGNf cannot be retarded sufficiently because the ignition timing before the retarding correction is set at an excessively advanced angle). Therefore, the controller of the present embodiment is designed to diagnose whether of not there is an anomaly in the temperature rise control that is carried out by retarding the ignition timing as described above. This diagnosis processing will be described by referring to FIGS. 2 and 3.

Figure 2:
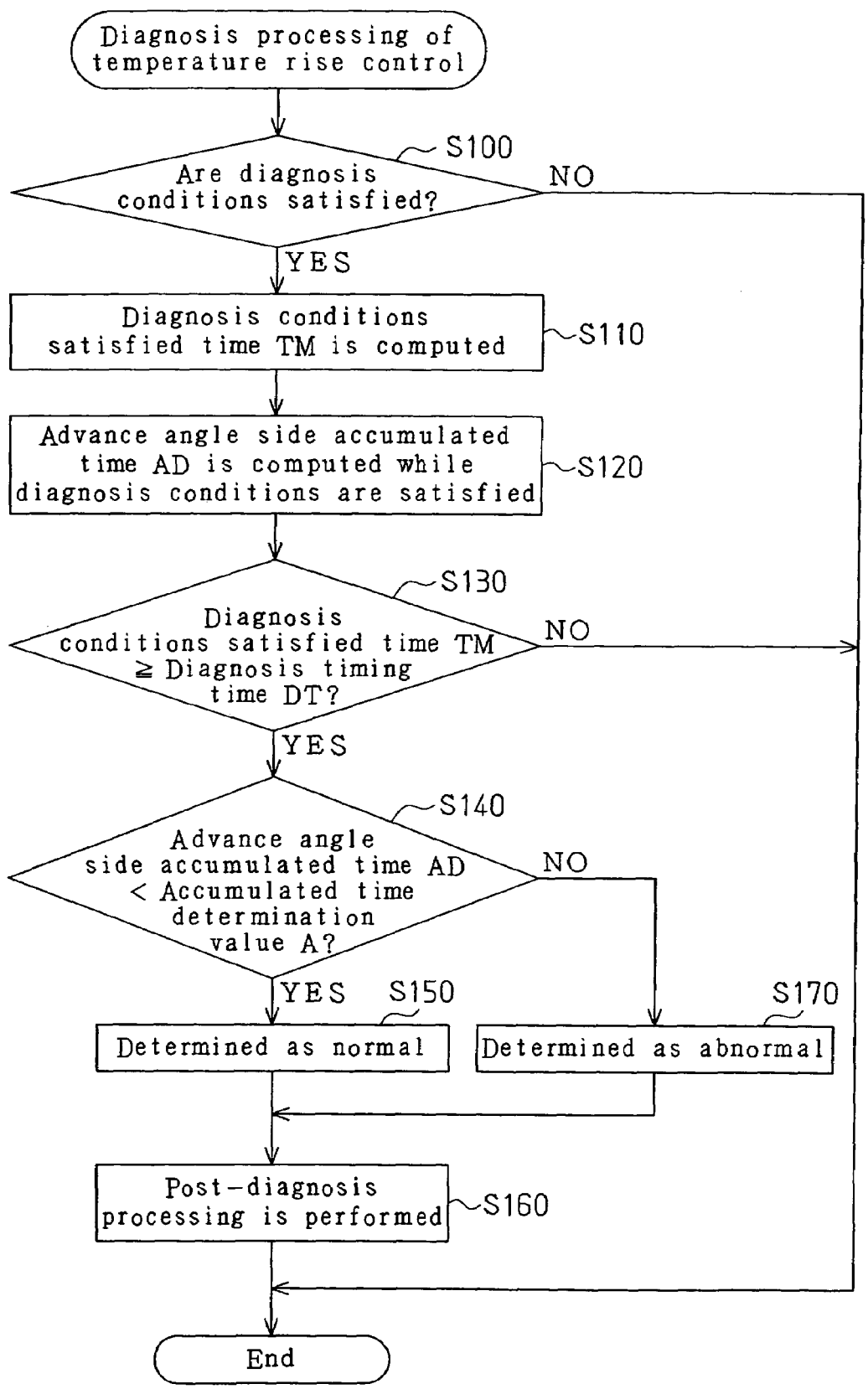
FIG. 2 is a flow chart showing the procedures for diagnosing temperature rise control according to a first embodiment.

FIG. 2 illustrates the procedures for diagnosing the temperature rise control executed by the controller 50.

Upon the start of this processing, it is first determined whether or not specific diagnosis conditions have been satisfied (S100). According to the present embodiment, it is determined that the diagnosis conditions have been satisfied only if all of the following conditions (a1) through (a5) are met.

(a1) A predetermined time (e.g., two seconds) or more has elapsed after starting of the engine;

(a2) The cooling coolant temperature THW is in a predetermined range (e.g., in a range from −10° C. to 50° C.);

(a3) The starter signal is OFF;

(a4) Ignition timing control that is performed to return to normal fuel injection after fuel-cut during deceleration has been completed; and (a5) Either one of the following (a5-1) or (a5-2) is satisfied:

(a5-1) The battery voltage is a predetermined value (e.g., 11V) or greater; and (a5-2) A predetermined time (e.g., five seconds) has not yet elapsed after the starting of the engine, and the battery voltage is greater than or equal to a startup voltage value (e.g., 8V) that is set lower than the predetermined value.

The conditions (a1) and (a2) are for determining whether the control of temperature rise is being carried out. The condition of (a3) is set for the reason that, if the starter motor is in operation, the engine speed NE is too low to set the proper ignition timing. The condition of (a4) is set because, ignition timing cannot be set for the temperature rise control when ignition timing control is performed to return fuel-cut. Fuel-cut is carried out during starting of the engine, for example, when the accelerator pedal is depressed hard by a driver and the engine speed reaches a level that triggers fuel-cut. The condition of (a5-1) is set because, if the battery voltage is too low, the spark of the ignition plug is weak and the engine operating conditions are thus instable. However, since the battery voltage sometimes drops temporarily immediately after starting the engine, the condition of (a5-2) is additionally set to increase the frequency that the diagnosis conditions are satisfied, that is, for increasing the frequency for performing diagnosing temperature rise control.

If the diagnosis conditions are not satisfied (NO in S100), the processing is temporarily terminated.

If the diagnosis conditions are satisfied (YES in S100), cumulative computation of diagnosis conditions satisfied time TM, which is the time period for which the above diagnosis conditions are satisfied, is started (S110). The cumulative computation of the diagnosis conditions satisfied time TM is performed by a timer counter in the controller 50.

In the next step, advance angle side accumulated time AD during the period in which the diagnosis conditions are satisfied is computed (S120). The advance angle side accumulated time AD is obtained by accumulating the time during which the final ignition timing IGNf has been set exceeding a threshold value to an advanced angle side, in other words, by accumulating the time during which the catalyst device 30 is exposed to exhaust gas having a low temperature. As the advance angle side accumulated time AD increases, the temperature rise in the catalyst device 30 is more inhibited. In other words, the temperature rise condition of the catalyst device 30 is monitored based on the advance angle side accumulated time AD. The advance angle side accumulated time AD is computed as an accumulated value of time during which the following expression (1) is satisfied.

$$\text{final ignition timing grading value IGNfN} \geq \text{threshold value } \alpha \text{ (basic ignition timing grading value IGNbN+ignition timing determination value } \beta) \quad (1)$$

The final ignition timing IGNf and the basic ignition timing IGNb vary in accordance with engine operating conditions. Thus, the present embodiment employs, for the expression (1) above, the final ignition timing grading value IGNfN and basic ignition timing grading value IGNbN obtained by grading the final ignition timing IGNf and basic ignition timing IGNb, respectively, in order to stabilize the determination accuracy of this expression (1).

The threshold value $\alpha$ is set as a value for determining whether or not the final ignition timing IGNf is being retarded. The basic ignition timing IGNb changes depending on engine operating conditions. Thus, the final ignition timing IGNf also changes depending on the engine operating conditions. Therefore, the threshold value $\alpha$ is set as a value obtained by adding an ignition timing determination value $\beta$ to the basic ignition timing grading value IGNbN so that the threshold value $\alpha$ follows the change of the final ignition timing IGNf. The ignition timing determination value $\beta$ is set beforehand as a fixed value for determining whether or not an ignition timing retard angle is set to an amount required for raising the temperature in the catalyst device 30. As the result of such settings, the threshold value $\alpha$ follows changes of the final ignition timing IGNf that is variably set during execution of temperature rise control. This improves the determination accuracy of expression (1). Consequently, the diagnosis accuracy of the temperature rise control is also improved.

In this manner, expression (1) is satisfied when the retard angle amount of the final ignition timing IGNf is not sufficient (when the advance angle amount of the final ignition timing IGNf is too large).

In the next step, it is determined whether or not the diagnosis conditions satisfied time TM has reached a diagnosis timing time DT (S130). Although the diagnosis timing time DT is set to 10 seconds in the present embodiment, it is not limited to this value. If the diagnosis conditions satisfied time TM has not reached the diagnosis timing time DT (No in S130), the processing is temporarily terminated, and the cumulative computation of the diagnosis conditions satisfied time TM is resumed and continued.

If the diagnosis conditions satisfied time TM has reached or exceeded the diagnosis timing time DT (YES in S130), it is determined whether or not the accumulated advance angle side time AD is less than an accumulated time determination value A (S140). This accumulated time determination value A is a value for determining whether the temperature in the catalyst device 30 is raised sufficiently and, in the present embodiment, is set to eight seconds. The accumulated time determination value A may be set to a value other than eight seconds.

If the advance angle side accumulated time AD is less than the accumulated time determination value A (YES in S140), the time period during which the final ignition timing IGNf has been set at an angle advanced from the threshold value $\alpha$ is short, that is, the time period during which the ignition timing has been retarded normally is long. Therefore, it is determined that the temperature in the catalyst device has been sufficiently raised. Accordingly, it is determined that there is no anomaly in the temperature rise control, and the control is performed normally (S150). Post-diagnosis processing is then carried out by clearing the diagnosis conditions satisfied time TM and the advance angle side accumulated time AD to zero (S160), and the processing is temporarily terminated.

If the advance angle side accumulated time AD is greater than the accumulated time determination value A (NO in S140), the time period during which the final ignition timing IGNf has been set at an angle advanced from the threshold value $\alpha$ is long, that is, the time period during which the ignition timing has been retarded normally is short. Therefore, it may be determined that the temperature in the catalyst device has not been raised sufficiently. Accordingly, it is determined that there is an anomaly in the temperature rise control (S170). The post-diagnosis processing is then carried out (S160), and the processing is temporarily terminated.

Figure 3:
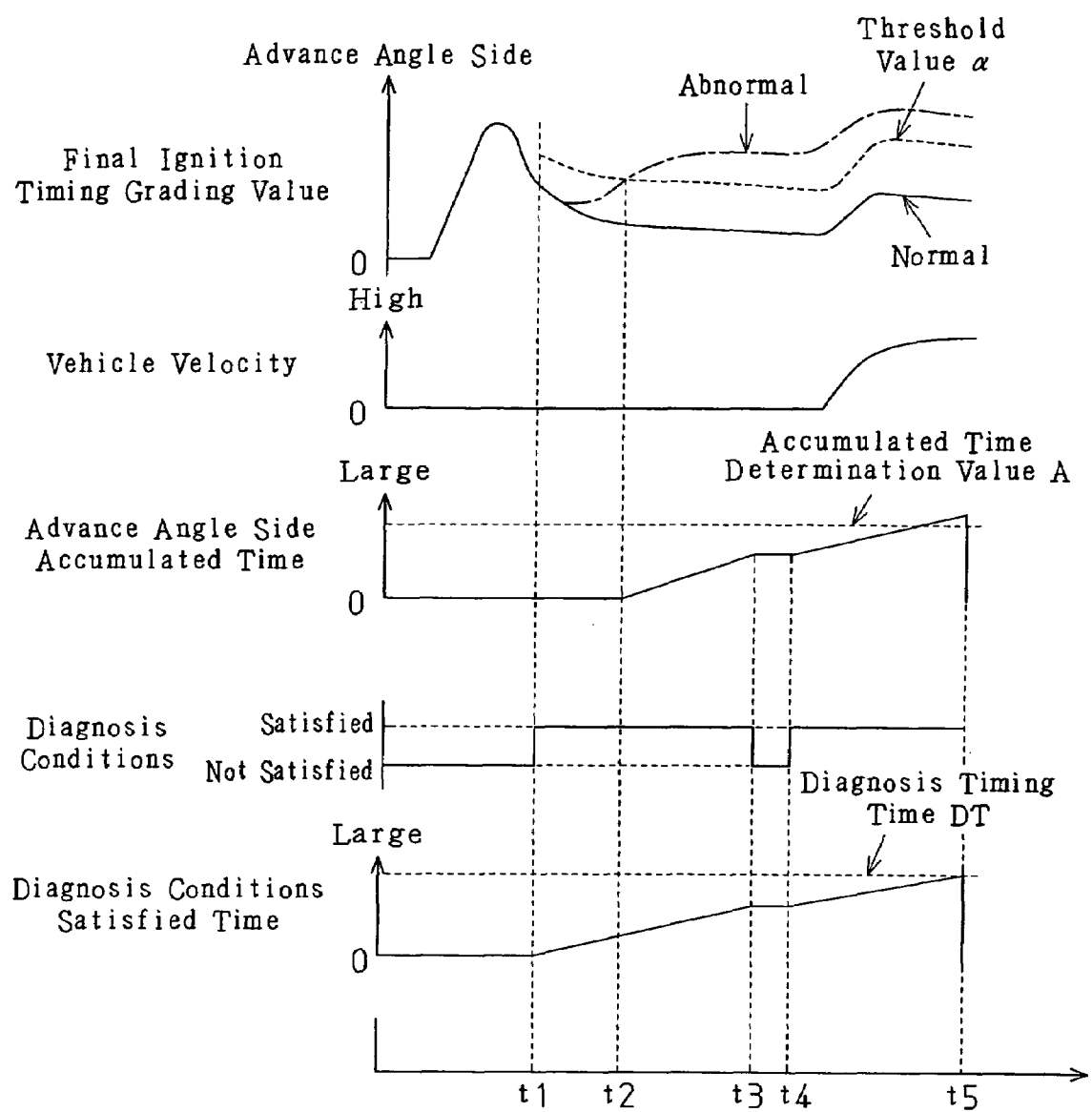
FIG. 3 is a timing chart illustrating an example of temporal transitions of diagnosis conditions satisfied time and accumulated advance angle side time when the temperature rise control is diagnosed in the first embodiment.

FIG. 3 shows temporal transitions of the diagnosis conditions satisfied time TM and advance angle side accumulated time AD when the diagnosis processing is executed.

First, when the engine is started and the diagnosis conditions (a1) through (a5) are satisfied (time t1), cumulative computation of the diagnosis conditions satisfied time TM is started. When final ignition timing grading value IGNfN is set exceeding the threshold value $\alpha$ at an advance angle side when the diagnosis conditions are satisfied (after time t2), cumulative computation of the advance angle side accumulated time AD is performed. Subsequently, if any of the diagnosis conditions becomes temporarily unsatisfied (time t3), the cumulative computation of the diagnosis conditions satisfied time TM and the advance angle side accumulated time AD is interrupted temporarily. The cumulative computation is restarted when the diagnosis conditions are satisfied again (time t4). When the diagnosis conditions satisfied time TM reaches the diagnosis timing time DT (time t5), it is determined whether or not the advance angle side accumulated time AD is less than the accumulated time determination value A. Based on the result of this determination, it is then diagnosed if there is an anomaly in the temperature rise control of the catalyst device 30. Once the diagnosis of the temperature rise control is performed, the diagnosis conditions satisfied time TM and advance angle side accumulated time AD are cleared.

If diagnosis of temperature rise control is conducted by comparing the value of ignition timing with a predetermined threshold value, the temperature rise control may be diagnosed as having an anomaly even though the catalyst device temperature has been sufficiently raised. Accordingly, the present embodiment employs the time at which the ignition timing has exceeded the threshold value to diagnose the temperature rise control. Therefore, it is possible to determine with high accuracy whether or not the temperature in the catalyst device is raised appropriately and hence determine whether the effect of the temperature rise control is optimal. In other words, the diagnosis accuracy of the temperature rise control is improved.

As described above, the internal combustion engine controller of the present embodiment has the advantages described below.

(1) The condition of temperature rise in the catalyst device is monitored by cumulatively computing time during which the ignition timing retarded by controlling the temperature rise has been set exceeding the threshold value $\alpha$ at an advance angle side, that is, during which the catalyst device has been exposed to exhaust gas having a low temperature. Therefore, in the present embodiment, the diagnosis of the temperature rise control is carried out by monitoring the condition of temperature rise in the catalyst based on the accumulated time (advance angle side accumulated time AD). More specifically, if the advance angle side accumulated time AD is less than the accumulated time determination value A, it is determined that there is no anomaly in the temperature rise control. If the advance angle side accumulated time AD is the accumulated time determination value A or greater, it is determined that there is an anomaly in the temperature rise control. As a result, the temperature rise control is diagnosed for an anomaly with high accuracy without being affected by temporary fluctuations of the ignition timing.

(2) The value obtained by adding the ignition timing determination value $\beta$ to the basic ignition timing grading value IGNb is set as the threshold value $\alpha$. Therefore, the threshold value $\alpha$ follows changes in the ignition timing that is set during the temperature rise control. As a result, an optimal threshold value taking into consideration change of ignition timing that is set based on engine operation conditions is always set. Therefore, diagnosis of the temperature rise control is conducted with higher accuracy.

Second Embodiment

An internal combustion engine controller according to a second embodiment of the present invention will now be described with reference to FIG. 4.

In the first embodiment, the diagnosis of temperature rise control is carried out by obtaining the advance angle side accumulated time AD that is accumulated time for the final ignition timing IGNf, which has been set exceeding the threshold value to an advance angle side (a state in which the catalyst device 30 has been exposed to exhaust gas having a low temperature), and comparing the advance angle side accumulated time AD with the accumulated time determination value A.

The present embodiment differs from the first embodiment in that the diagnosis of temperature rise control is carried out by obtaining a retard angle side accumulated time RE that is the accumulated time during which the final ignition timing IGNf has been set exceeding a threshold value to a retard angle side (a state in which the catalyst device 30 has been exposed to exhaust gas having a high temperature) and comparing the retard angle side accumulated time RE with an accumulated time determination value B. The first and second embodiments are basically the same in all other points. Therefore, the different point will mainly be described below.

Figure 4:
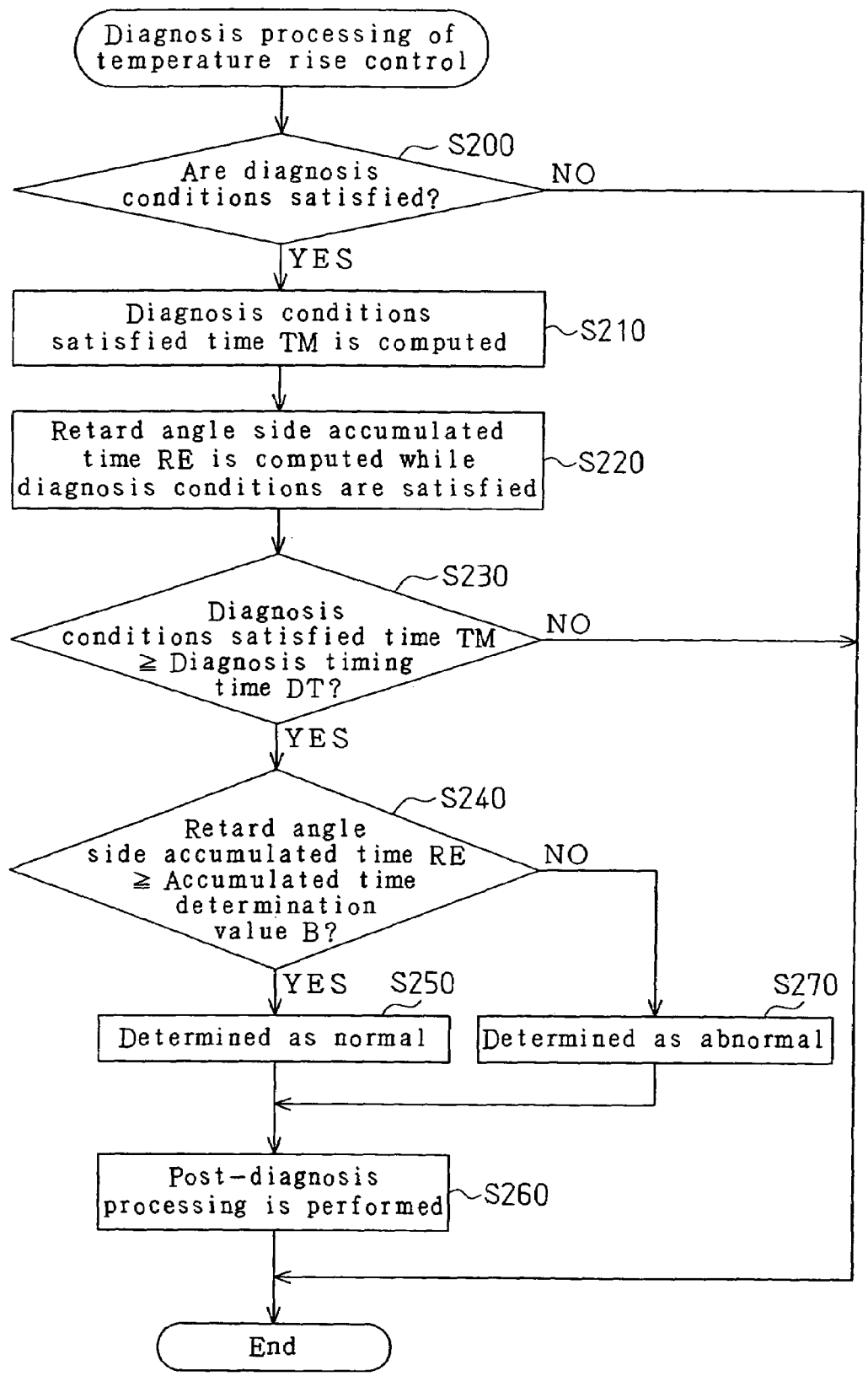
FIG. 4 is a flow chart showing the procedures for diagnosing temperature rise control according to a second embodiment.

FIG. 4 shows the procedures for diagnosing temperature rise control performed by the controller 50 in the present embodiment.

Upon the starting of this processing, it is first determined whether or not the diagnosis conditions are satisfied (S200). The processing in step S200 is similar to that in step S100 described above.

If the diagnosis conditions are not satisfied (NO in S200), the processing is temporarily terminated.

If the diagnosis conditions are satisfied (YES in S200), cumulative computation of diagnosis conditions satisfied time TM, which is the time period for which the diagnosis conditions have been satisfied, is started (S210). The processing in this step S210 is similar to that in step S110 described above.

In the next step, a retard angle side accumulated time RE during which the diagnosis conditions are satisfied is computed (S220). The retard angle side accumulated time RE is the accumulated time during which the final ignition timing IGNf has been set exceeding a threshold value at a retard angle side, that is, the catalyst device 30 has been exposed to exhaust gas having high temperature. As the retard angle side accumulated time RE decreases, the temperature rise in the catalyst device 30 is more inhibited. Thus, the temperature rise of the catalyst device 30 is monitored based on the retard angle side accumulated time RE. The retard angle side accumulated time RE is computed as a cumulative value of the time period for which the following expression (2) is met.

$$\text{final ignition timing grading value IGNfN} \leq \text{threshold value } \alpha \text{ (basic ignition timing grading value IGNbN+ignition timing determination value } \beta) \quad (2)$$

Even though the ignition timing determination value $\beta$ in the present embodiment is set to the same value as that of the first embodiment, the ignition timing determination value $\beta$ may be set to a value differing from that of the first embodiment.

Thus, the expression (2) is met if the amount of the retard angle of final ignition timing IGNf is not deficient.

In the next step, it is determined whether or not the diagnosis conditions satisfied time TM has reached a diagnosis timing time DT (S230). The processing in this step S230 is similar to that of step S130 described above.

If the diagnosis conditions satisfied time TM has not reached the diagnosis timing time DT (NO in S230), the processing is temporarily terminated. Further, the cumulative computation of the diagnosis conditions satisfied time TM is resumed and continued.

If the diagnosis conditions satisfied time TM has reached or exceeded the diagnosis timing time DT (YES in 230), it is determined whether the retard angle side accumulated time RE is greater than or equal to an accumulated time determination value B (S240). The accumulated time determination value B is a value set for determining whether or not the temperature in the catalyst device 30 has been raised sufficiently and is set to two seconds in the present embodiment. The accumulated time determination value B may be set to a value other than two seconds.

If the retard angle side accumulated time RE is greater than or equal to the accumulated time determination value B (YES in S240), the time period during which the final ignition timing IGNf has been set at a more retarded angle than the threshold value $\alpha$ is long, that is, the time period during which the ignition timing has been retarded properly is long. Hence, it is determined that the temperature in the catalyst device has been sufficiently raised. Accordingly, it is determined that there is no anomaly in the temperature rise control and the control is being carried out normally (S250). Post-diagnosis processing is then carried out by clearing the diagnosis conditions satisfied time TM and the retard angle side accumulated time RE to zero (S260). Then, the processing is temporarily terminated.

If the retard angle side accumulated time RE is less than the accumulated time determination value B (NO in S240), the time period during which the final ignition timing IGNf has been set at a more retarded angle than the threshold value $\alpha$ is short, that is, the time period during which the ignition timing has been retarded properly is short. Hence, it is determined that the temperature in the catalyst device has not been raised sufficiently. Accordingly, it is determined that there is an anomaly in the temperature rise control (S270). The post-diagnosis processing is then carried out as described above (S260), and the processing is temporarily terminated.

As described above, the internal combustion engine controller of the present embodiment has the advantages described below.

(1) The condition of temperature rise in the catalyst device is monitored by computing the accumulated time during which the ignition timing retarded by the temperature rise control has been set exceeding a threshold value $\alpha$ at an advance angle side, that is, during which the catalyst device has been exposed to exhaust gas having a high temperature. Therefore, in the present embodiment, the diagnosis of the temperature rise control is carried out by monitoring the condition of temperature rise based on the accumulated time (retard angle side accumulated time RE). More specifically, if the retard angle side accumulated time RE is greater than or equal to the accumulated time determination value B, it is determined that there is no anomaly in the temperature rise control. If the accumulated advance retard side time RE is less than the accumulated time determination value B, it is determined that there is an anomaly in the temperature rise control. Accordingly, the temperature rise control is diagnosed for an anomaly with high accuracy without being affected by temporary fluctuation of the ignition timing.

(2) The value obtained by adding the ignition timing determination value $\beta$ to the basic ignition timing grading value IGNb is set as the threshold value $\alpha$. Therefore, the threshold value $\alpha$ follows the change of the ignition timing that is set during execution of the temperature rise control, and the threshold value is always set to the optimal value by taking into consideration changes in ignition timing that is set based on the engine operation conditions. As a result, diagnosis of the temperature rise control is conducted with higher accuracy.

Third Embodiment

An internal combustion engine controller according to a third embodiment of the present invention will now be described in detail with reference to FIG. 5.

In the first embodiment, it is determined that there is no anomaly in the temperature rise control if the advance angle side accumulated time AD is less than the accumulated time determination value A. Further, it is determined that there is an anomaly in the temperature rise control if the advance angle side accumulated time AD is greater than or equal to the accumulated time determination value A. In the third embodiment, a normality determination value C and an anomaly determination value D are set separately for diagnosing whether or not there is an anomaly in the temperature rise control and, in some cases, for suspending the diagnosis. The procedures for diagnosis processing in the third embodiment partially differ from the first embodiment subsequent to step S130. The differing parts will mainly be described below.

Figure 5:
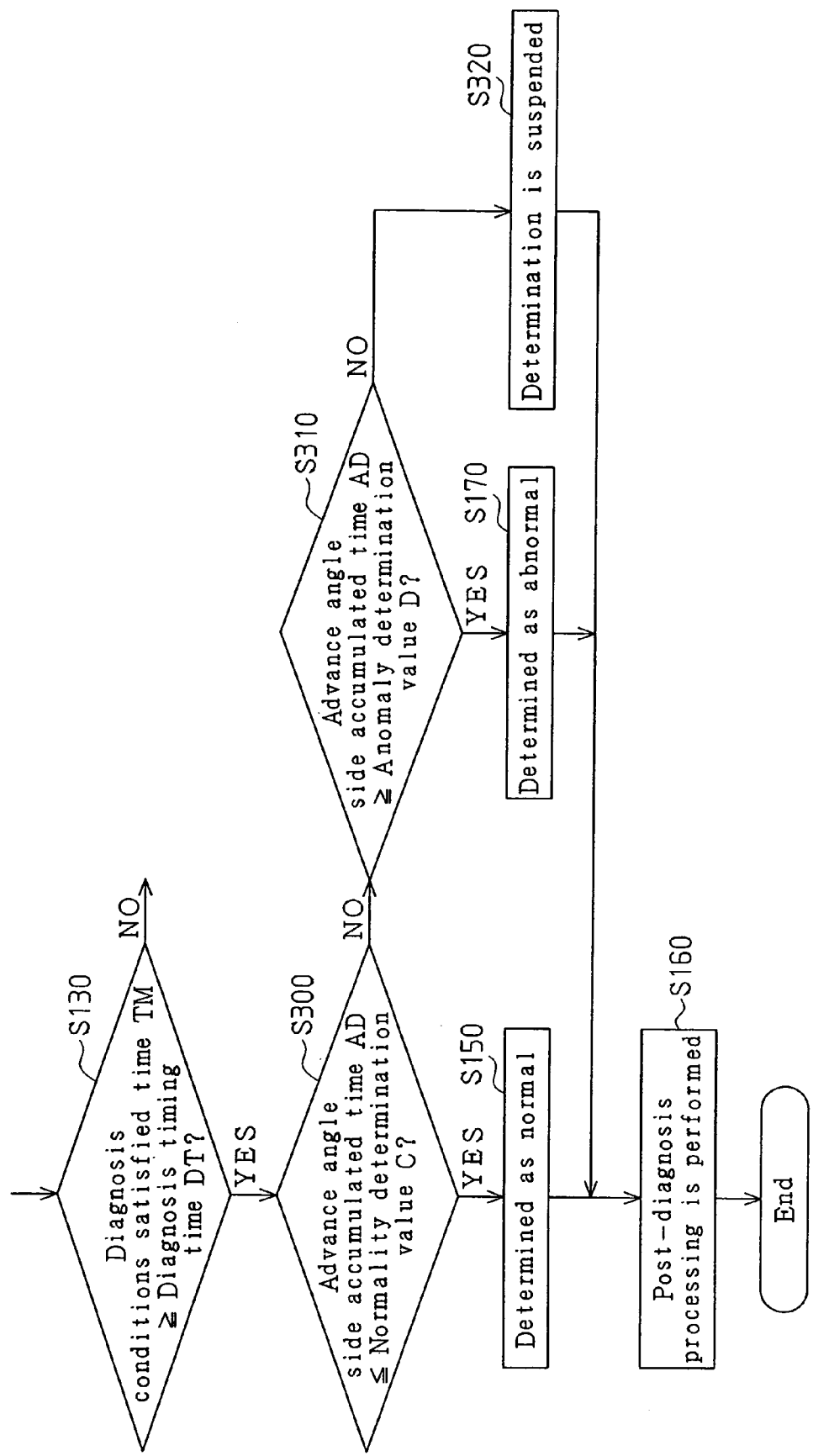
FIG. 5 is a flow chart showing the procedures for diagnosing temperature rise control according to a third embodiment.

In the temperature rise control diagnosis of the present embodiment, FIG. 5 shows the procedures subsequent to step 130 that differ from the first embodiment. This processing is also executed by the controller 50.

If it is determined through the processing in S130 that the diagnosis conditions satisfied time TM is less than the diagnosis timing time DT (NO in S130), the diagnosis processing is temporarily terminated to resume and continue the cumulative computation of the diagnosis conditions satisfied time TM.

If it is determined that the diagnosis conditions satisfied time TM is greater than or equal to the diagnosis timing time DT (YES in S130), it is then determined whether or not the advance angle side accumulated time AD is less than or equal to the normality determination value C (S300). The normality determination value C is set beforehand as a fixed value for determining whether or not the temperature in the catalyst device 30 is being raised and is set to a shorter time period than the accumulated time determination value A.

If the advance angle side accumulated time AD is less than or equal to the normality determination value C (YES in S300), the time period during which the final ignition timing IGNf has been set at an angle advanced from the threshold value α is short, that is, the time period during which the ignition timing has been retarded properly is long. Hence, it is determined that the temperature of the catalyst device has sufficiently been increased. Therefore, it is determined that there is no anomaly in the temperature rise control and that the temperature rise control is being executed normally (S150). Post-diagnosis processing is then carried out by clearing the diagnosis conditions satisfied time TM and the advance angle side accumulated time AD to zero (S160). Then, and the diagnosis processing is temporarily terminated.

If the advance angle side accumulated time AD is longer than the normality determination value C (NO in S300), the time period during which the final ignition timing IGNf has been set at an angle advanced from the threshold value α is long, that is, the time period during which the ignition timing has been retarded properly is short. Thus, the temperature in the catalyst device possibly may not have been raised sufficiently. Therefore, it is determined whether or not the advance angle side accumulated time AD is greater than or equal to an anomaly determination value D (S310). The anomaly determination value D is set beforehand as a fixed value for determining whether or not the temperature rise in the catalyst device 30 is insufficient and is set to a value that is greater than the normality determination value C and the accumulated time determination value A. In other words, the accumulated time determination value A, the normality determination value C, and the anomaly determination value D are set to represent time of which length is as shown by the following expression (3).

$$\text{normality determination value C} < \text{accumulated time determination value A} < \text{anomaly determination value D} \quad (3)$$

If the advance angle side accumulated time AD is greater than or equal to the anomaly determination value D (Yes in S310), the time period during which the final ignition timing IGNf has been set to an angle advanced from the threshold value α is long, that is, the time period during which the ignition timing has been retarded properly is short. Hence, it is determined that the temperature rise in the catalyst device is insufficient. Accordingly, it is determined that there is an anomaly in the temperature rise control (S170). The post-diagnosis processing described above is then carried out (S160), and the diagnosis processing is temporarily terminated.

If the advance angle side accumulated time AD is less than the anomaly determination value D (NO in S310), the advance angle side accumulated time AD is between the normality determination value and the anomaly determination value. Thus, it is determined that the temperature rise control cannot be accurately diagnosed for an anomaly, and the determination of an anomaly is suspended (S320). The post-diagnosis processing as described above is then carried out (S160), and the diagnosis processing is temporarily terminated.

As described above, the internal combustion engine controller according to this third embodiment has the following advantages in addition to those of the first embodiment.

(1) It is diagnosed whether or not there is an anomaly in the temperature rise control by setting the normality determination value C for determining that the temperature in the catalyst device is being sufficiently raised, the anomaly determination value D for determining that the temperature rise in the catalyst device is insufficient. The value of the advance angle side accumulated time AD is compared with these determination values. This further ensures that the condition of temperature rise in the catalyst device is diagnosed.

(2) When the temperature rise condition in the catalyst device cannot be sufficiently diagnosed (a state satisfying the relationship of normality determination value C<advance angle side accumulated time AD<anomaly determination value D), the diagnosis of the temperature rise control is suspended. As a result, the reliability of the determination of an anomaly or normality for the catalyst device is improved.

Fourth Embodiment

An internal combustion engine controller according to a fourth embodiment to the present invention will now be described in detail with reference to FIG. 6.

In the second embodiment, it is determined that there is no anomaly in the temperature rise control if the retard angle side accumulated time RE is greater than or equal to the accumulated time determination value B. Further, it is determined that there is an anomaly in the temperature rise control if the retard angle side accumulated time RE is less than the accumulated time determination value B. In the fourth embodiment, a normality determination value E and an anomaly determination value F are set separately for diagnosing whether or not there is an anomaly in the temperature rise control. In some cases, the diagnosis is suspended. Therefore, the processing for the fourth embodiment partially differs from that of the second embodiment subsequent to step S130. The differing points will mainly be described below.

Figure 6:
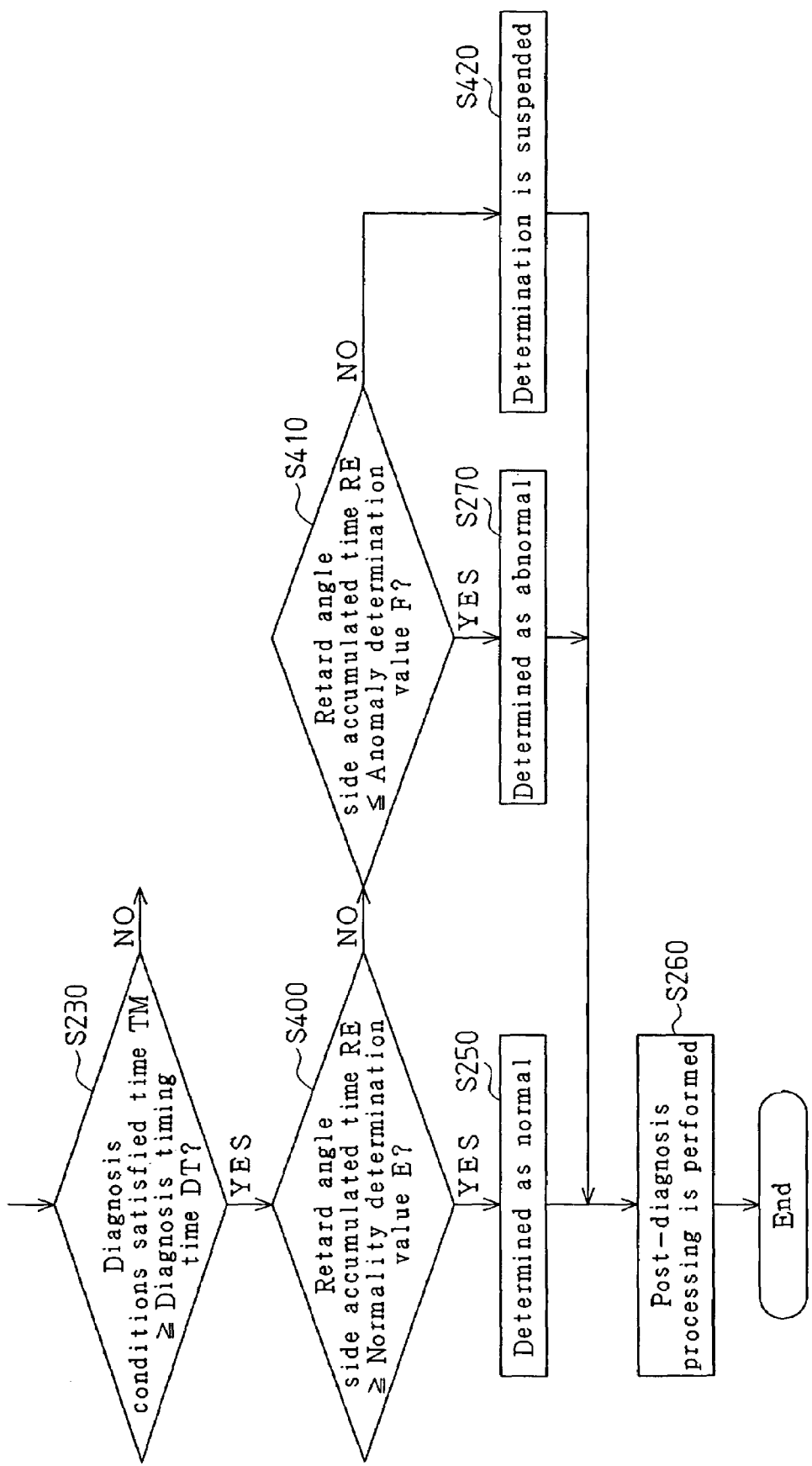
FIG. 6 is a flow chart showing the procedures for diagnosing temperature rise control according to a fourth embodiment.

In the diagnosis processing for temperature rise control of the present embodiment, FIG. 6 shows the procedures subsequent to step 230 that differ from the second embodiment. This processing is also executed by the controller 50.

If it is determined, as the result of the processing in S230, that the diagnosis conditions satisfied time TM is less than the diagnosis timing time DT (NO in S230), the diagnosis processing is temporarily terminated to resume and continue the cumulative computation of the diagnosis conditions satisfied time TM.

If it is determined that the diagnosis conditions satisfied time TM is greater than or equal to the diagnosis timing time DT (YES in S230), it is then determined whether or not the retard angle side accumulated time RE is greater than or equal to the normality determination value E (S400). The normality determination value E is set beforehand as a fixed value for determining whether or not the temperature in the catalyst device 30 is sufficiently raised and is set to a larger value than the accumulated time determination value B.

If the retard angle side accumulated time RE is greater than or equal to the normality determination value E (YES in S400), the time period during which the final ignition timing IGNf has been set at an angle more retarded than the threshold value α is long, that is, the time period during which the ignition timing has been retarded properly is long. Hence, it is determined that the temperature in the catalyst device has been sufficiently raised. Therefore, it is determined that there is no anomaly in the temperature rise control and that the control is executed normally (S250). Post-diagnosis processing is then carried out by clearing the diagnosis conditions satisfied time TM and the advance angle side accumulated time AD to zero (S260), and the diagnosis processing is temporarily terminated.

If the retard angle side accumulated time RE is less than the normality determination value E (NO in S400), the time period during which the final ignition timing IGNf has been set at an angle more retarded than the threshold value α is short, that is, the time period during which the ignition timing has been retarded properly is short. Hence, the temperature in the catalyst device may not have been raised sufficiently. Therefore, it is then determined whether or not the retard angle side accumulated time RE is less than or equal to the anomaly determination value F (S410). The anomaly determination value F is set beforehand as a fixed value for determining whether or not the temperature rise in the catalyst device 30 is insufficient, and is set to a larger value than the normality determination value E and the accumulated time determination value B. In other words, the accumulated time determination value B, the normality determination value E, and the anomaly determination value F are set to represent time of which length is as shown by the following expression (4).

anomaly determination value F<accumulated time
determination value B<normality determination
value E            (4)

If the retard angle side accumulated time RE is less than or equal to the anomaly determination value F (Yes in S410), the time period during which the final ignition timing IGNf has been set to an angle more retarded than the threshold value α is short, that is, the time period during which the ignition timing has been retarded properly is short. Hence, it is determined that the temperature rise in the catalyst device is insufficient. Accordingly, it is determined that there is an anomaly in the temperature rise control (S270). The post-diagnosis processing is then carried out (S260), and the diagnosis processing is temporarily terminated.

If the retard angle side accumulated time RE is greater than the anomaly determination value F (NO in S410), it is determined that the retard angle side accumulated time RE is between the normality determination value and anomaly determination value and that the temperature rise control cannot be reliably diagnosed for an anomaly. Thus, the determination of an anomaly is suspended (S420). The post-diagnosis processing is then carried out (S260), and the diagnosis processing is temporarily terminated.

As described above, the internal combustion engine controller of the fourth embodiment has the advantages described below in addition to those of the second embodiment.

(1) It is diagnosed whether or not there is an anomaly in temperature rise control by setting the normality determination value E for determining that the temperature in the catalyst device is sufficiently raised and the anomaly determination value F for determining that the temperature rise in the catalyst device is insufficient. The retard angle side accumulated time RE is compared with these determination values. This further ensures that the condition of temperature rise in the catalyst device is diagnosed.

(2) When the temperature rise condition in the catalyst device cannot be sufficiently diagnosed (a state satisfying the relationship of anomaly determination value F<retard angle side accumulated time RE<normality determination value E), the diagnosis of the temperature rise control is suspended. As a result, the reliability of the determination of an anomaly or normality for the catalyst device is improved.

It should be apparent to those skilled in the art that the present invention may be embodied in many other specific forms without departing from the spirit or scope of the invention. Particularly, it should be understood that the present invention may be embodied in the following forms.

In the first and third embodiments, the determination of whether or not there is an anomaly is based on the comparison result of the advance angle side accumulated time AD and the predetermined determination value. This determination may be used as a tentative determination. It is determined that there is no anomaly in the temperature rise control only after the temperature rise control is tentatively determined as being normal for a certain number of times. Further, it is determined that there is an anomaly in the temperature rise control only after the temperature rise control is tentatively determined as having an anomaly for a certain number of times.

Similarly, in the second and fourth embodiments, the determination of whether or not there is an anomaly is based on the comparison result of the retard angle side accumulated time RE and the predetermined determination value may be used as a tentative determination. It is determined that there is no anomaly in the temperature rise control only after the temperature rise control is tentatively determined as being normal for a certain number of times. Further, it is determined that there is an anomaly in the temperature rise control only after the temperature rise control is tentatively determined as having an anomaly for a certain number of times.

Figure 7:
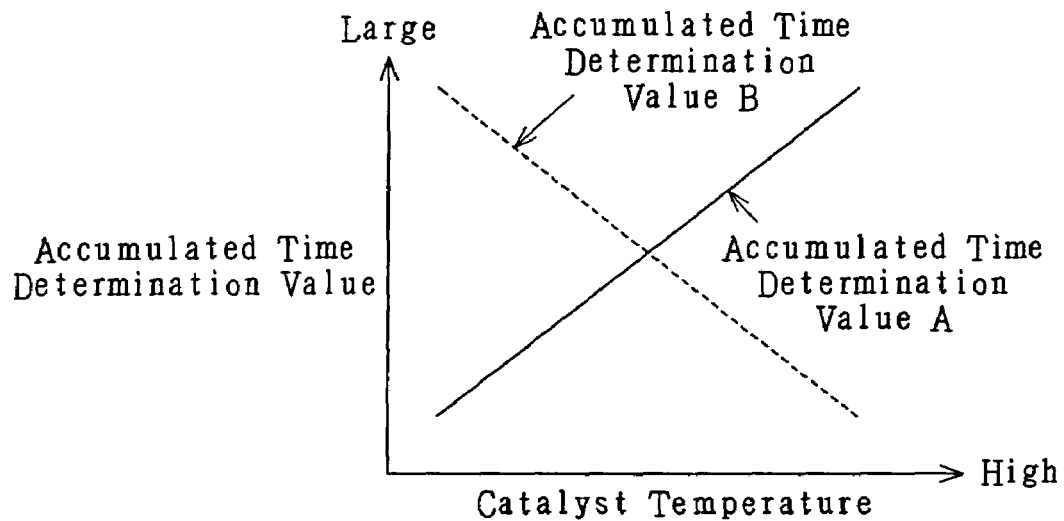
FIG. 7 is a graph illustrating an example of the setting of an accumulated time determination value in modified examples of the first and second embodiments.

In the above embodiments, the accumulated time determination values A and B, the normality determination values C and E, and the anomaly determination values D and F are each set as fixed values. Even if the time period during which the catalyst device 30 is exposed to exhaust gas having high temperature is short, such as when the advance angle side accumulated time AD is long or the retard angle side accumulated time RE is short, the temperature of the catalyst device 30 is sufficiently raised if the temperature of the catalyst device itself is high. In other words, even if the advance angle side accumulated time AD is long or the retard angle side accumulated time RE is short, the adverse effects will not be serious as long as the temperature of the catalyst device 30 is high. Therefore, the first embodiment may be modified such that the accumulated time determination value A is variably set according to the temperature of the catalyst device 30. For example, as shown in FIG. 7 by the solid line, the accumulated time determination value A may be set to a larger value as the temperature of the catalyst device 30 becomes higher. In this case, even if the value of the advance angle side accumulated time AD is large, it is determined that there is no anomaly in the temperature rise control when the temperature of the catalyst device 30 is high. Therefore, the diagnosis is performed more in accordance with the condition of temperature rise in the catalyst device 30. Accordingly, the accumulated time determination value A is set taking into consideration the temperature of the catalyst device 30 itself and the time period during which the catalyst device is heated by exhaust gas. In this manner, since the accumulated time determination value A for determining the condition of temperature rise in the catalyst device 30 is set variably according to temperature of the catalyst device 30, the condition of temperature rise in the catalyst device 30 is recognized more accurately. Hence, the accuracy of the diagnosis described above is improved.

Similarly, in the second embodiment, the accumulated time determination value B may be set variably according to temperature of the catalyst device 30. For example, as shown in FIG. 7 by the broken line, the accumulated time determination value B may be set to a smaller value as the temperature of the catalyst device 30 becomes higher. In this case, even if the value of the retard angle side accumulated time RE is small, it is determined that there is no anomaly in the temperature rise control when the temperature of the catalyst device 30 is high. Therefore, diagnosis of the temperature rise control is performed in more accordance with the condition of temperature rise in the catalyst device 30.

Figure 8:
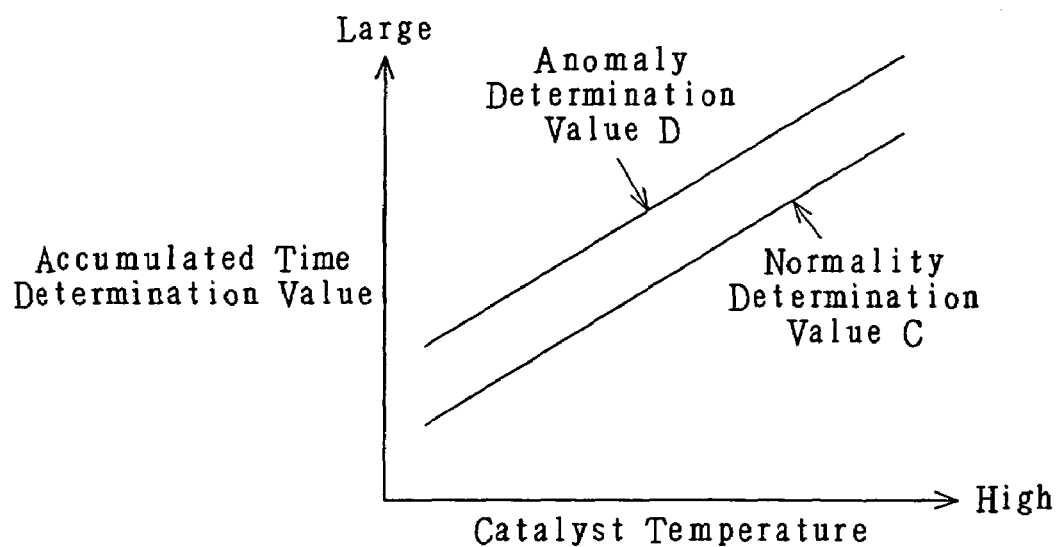
FIG. 8 is a graph illustrating an example of the setting of a normality determination value and an anomaly determination value in a modified example of the third embodiment.

Similarly, in the third embodiment, the normality determination value C and the anomaly determination value D may be set variably according to temperature of the catalyst device 30. For example, as shown in FIG. 8, the normality determination value C and anomaly determination value D may each be set to higher values as the temperature of the catalyst device 30 becomes higher. In this case, even if the value of the advance angle side accumulated time AD is large, it is more likely to be determined that there is no anomaly in the temperature rise control and more unlikely to be determined that there is an anomaly when the temperature of the catalyst device 30 is high. Therefore, the diagnosis of the temperature rise control is performed more in accordance with the condition of temperature rise in the catalyst device 30.

Figure 9:
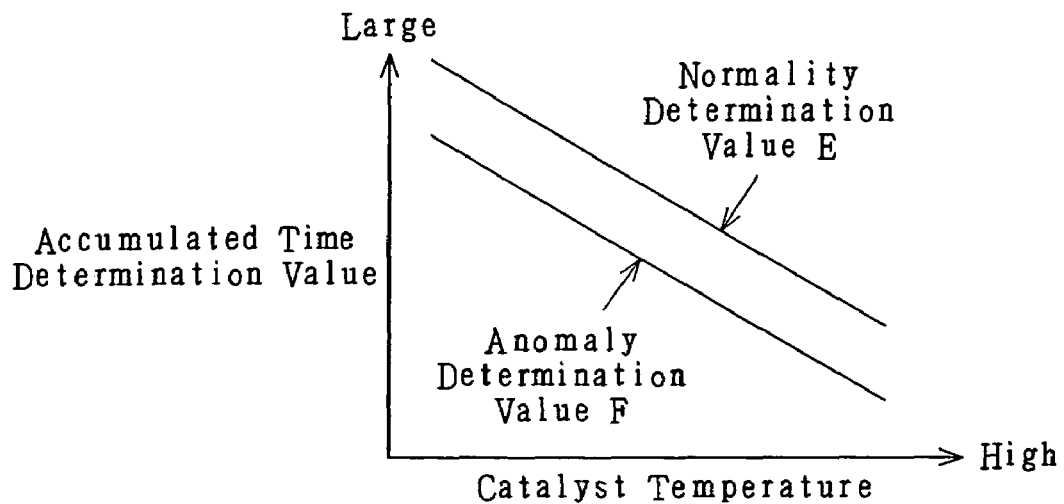
FIG. 9 is a graph illustrating an example of the setting of a normality determination value and an anomaly determination value in a modified example of the fourth embodiment.

Similarly, in the fourth embodiment, the normality determination value E and the anomaly determination value F may be variably set according to the temperature of the catalyst device 30. For example, as shown in FIG. 9, the normality determination value E and the anomaly determination value F may each be set to smaller values as the temperature of the catalyst device 30 becomes higher. In this case, even if the value of the retard angle side accumulated time RE is small, it is more likely to be determined that there is no anomaly in the temperature rise control and more unlikely to be determined that there is an anomaly when the temperature of the catalyst device 30 is high. Therefore, the diagnosis of the temperature rise control is performed more in accordance with the condition of temperature rise in the catalyst device 30.

Preferably, the accumulated time determination values A and B, the normality determination values C and E, and the anomaly determination values D and F may be set variably based on the temperature of the catalyst device 30 immediately before or after starting the engine or the temperature of the catalyst device 30 when the diagnosis conditions satisfied time TM becomes greater than or equal to the diagnosis timing DT (affirmative determination in S130 or S230).

The temperature of the catalyst device 30 becomes higher, for example, as the coolant temperature becomes higher when the engine is started, or as the engine stop time before starting becomes shorter, or as the engine load becomes higher. Therefore, the temperature of the catalyst device 30 may be estimated based on parameters that are correlated with the temperature of the catalyst device 30. The temperature of the catalyst device 30 may also be directly detected by using a temperature sensor.

Figure 10:
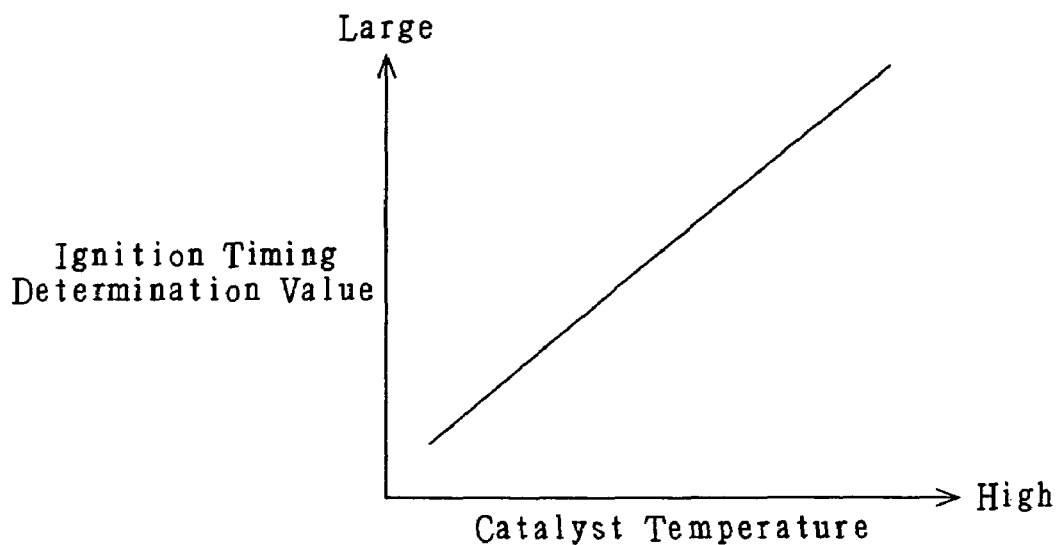
FIG. 10 is a graph illustrating an example of the setting of an ignition timing determination value in modified examples of the above embodiments.

The ignition timing determination value $\beta$ is a value set for determining whether the ignition timing retard angle is set to a required amount for raising the temperature of the catalyst device 30. If the advance angle amount of the final ignition timing IGNf is large and the rising rate of the exhaust gas temperature is small, the temperature of the catalyst device 30 is sufficiently raised as long as the temperature of the catalyst device 30 itself is high. In other words, even if the ignition advance angle is large, adverse effects will be insignificant if the temperature of the catalyst device 30 is high. Therefore, instead of setting the ignition timing determination value $\beta$ as a fixed value, the ignition timing determination value $\beta$ may be set variably according to the temperature of the catalyst device 30. For example, as shown in FIG. 10, the ignition timing determination value $\beta$ may be set variably such that as the temperature of the catalyst device 30 becomes higher, the ignition timing determination value $\beta$ assumes a larger value, namely, the ignition timing determination value $\beta$ assumes a larger advance angle value. This enables optimal determination of whether an ignition timing retard angle is set to the required amount to raise the temperature of the catalyst device 30. In other words, the ignition timing determination value $\beta$ is determined taking into consideration the temperature of the catalyst device 30 and the amount of heat received from exhaust gas. In this manner, the ignition timing determination value $\beta$ for determining the temperature rise condition of the catalyst device 30 is set variably according to temperature of the catalyst device 30. Therefore, the temperature rise condition of the catalyst device 30 is recognized more accurately and the diagnosis accuracy is improved.

The threshold value $\alpha$ in the above embodiments may be a variable value that is obtained directly from engine operating conditions, such as the engine speed NE and the engine load. Also, ignition timing set to the minimum retard angle required for raising the temperature of the catalyst device 30 may be a fixed value set as the threshold value $\alpha$.

In the above embodiments, the threshold value $\alpha$ is set to a value obtained by adding the ignition timing determination value $\beta$ to the basic ignition timing grading value GNbN. However, the threshold value $\alpha$ may be set to a value obtained by multiplying the basic ignition timing grading value IGNbN or basic ignition timing IGNb by a predetermined correction coefficient.

In the above embodiments, determination of the expressions (1) and (2) is made by using the final ignition timing grading value IGNfN or the basic ignition timing grading value IGNbN. However, the determination of the expressions (1) and (2) may be made by directly using the final ignition timing IGNf or the basic ignition timing IGNb without performing grading.

The retard angle side accumulated time RE may be obtained by subtracting the advance angle side accumulated time AD from the diagnosis timing time DT. Further, it is also possible to obtain the advance angle side accumulated time AD by subtracting the retard angle side accumulated time RE from the diagnosis timing time DT.

The present examples and embodiments are to be considered as illustrative and not restrictive, and the invention is not to be limited to the details given herein, but may be modified within the scope and equivalence of the appended claims.

What is claimed is:

1. An internal combustion engine controller for performing temperature rise control in a catalyst device by retarding ignition timing that is set based on engine operating conditions, the controller including logic that when executed performs steps including:

determining whether a period of time has accumulated for which ignition timing has been set exceeding a threshold value to an advance angle side during execution of temperature rise control, and diagnosing the temperature rise control for an anomaly based on the accumulated time, wherein the controller conducts said diagnosing the temperature rise control by comparing the advance angle side accumulated time with a predetermined accumulated time determination value, wherein the accumulated time determination value is changed in accordance with the temperature of the catalyst device, and wherein the accumulated time determination value is set to a higher value as the temperature of the catalyst device becomes higher.

2. An internal combustion engine controller for performing temperature rise control in a catalyst device by retarding ignition timing that is set based on engine operating conditions, the controller including logic that when executed performs steps including:

determining whether a period of time has accumulated for which ignition timing has been set exceeding a threshold value to retard angle side during execution of temperature rise control, and diagnosing the temperature rise control for an anomaly based on the accumulated time, wherein the controller conducts said diagnosing the temperature rise control by comparing the retard angle side accumulated time with a predetermined accumulated time determination value.

wherein the accumulated time determination value is changed in accordance with the temperature of the catalyst device, and wherein the accumulated time determination value is set to a smaller value as the temperature of the catalyst device becomes higher.

3. The internal combustion engine controller according to claim 2, wherein the threshold value is a value obtained by adding a predetermined ignition timing determination value to a value indicating the ignition timing.

4. The internal combustion engine controller according to claim 3, wherein the ignition timing determination value is changed in accordance with the temperature of the catalyst device.

5. The internal combustion engine controller according to claim 4, wherein the ignition timing determination value is set to a larger advance angle value as the temperature of the catalyst device becomes higher.

6. A method for performing temperature rise control in a catalyst device in an internal combustion engine, the method comprising:

retarding the ignition timing based on engine operating conditions, determining whether a period of time has accumulated for which ignition timing has been set exceeding a threshold value to a retard angle side during the temperature rise control; and diagnosing the temperature rise control for an anomaly based on the accumulated time;

wherein said diagnosing is performed by comparing the retard angle side accumulated time with a predetermined accumulated time determination value, wherein the accumulated time determination value is changed in accordance with the temperature of the catalyst device, and wherein the accumulated time determination value is set to a smaller value as the temperature of the catalyst device becomes higher.

7. The method according to claim 6, wherein the threshold value is a value obtained by adding a predetermined ignition timing determination value to a value indicating the ignition timing.

8. The method according to claim 7, wherein the ignition timing determination value is changed in accordance with the temperature of the catalyst device.

9. The method according to claim 8, wherein the ignition timing determination value is set to a larger advance angle value as the temperature of the catalyst device becomes higher.

* * * * *